United States Patent
Walsh et al.

(10) Patent No.: US 7,430,617 B2
(45) Date of Patent: Sep. 30, 2008

(54) METHOD AND SYSTEM FOR HEADER COMPRESSION

(75) Inventors: Rod Walsh, Tampere (FI); Juha-Pekka Luoma, Tampere (FI); Anne Saaranen, Tampere (FI)

(73) Assignee: Nokia Corporation, Espoo (FI)

( * ) Notice: Subject to any disclaimer, the term of this patent is extended or adjusted under 35 U.S.C. 154(b) by 916 days.

(21) Appl. No.: 10/739,066

(22) Filed: Dec. 19, 2003

(65) Prior Publication Data

US 2005/0160184 A1 Jul. 21, 2005

(51) Int. Cl.
*G06F 15/16* (2006.01)

(52) U.S. Cl. .................. 709/247; 709/246; 709/238; 370/392

(58) Field of Classification Search ............. 709/247, 709/246, 238, 230; 370/392
See application file for complete search history.

(56) References Cited

U.S. PATENT DOCUMENTS

| | | | |
|---|---|---|---|
| 6,292,840 B1 * | 9/2001 | Blomfield-Brown et al. | 709/247 |
| 6,300,897 B1 | 10/2001 | Kielb | |
| 6,556,587 B1 * | 4/2003 | Svanbro et al. | 370/471 |
| 6,608,841 B1 | 8/2003 | Koodli | |
| 6,618,397 B1 * | 9/2003 | Huang | 370/474 |
| 6,680,955 B1 | 1/2004 | Le | |
| 6,751,209 B1 | 6/2004 | Hamiti et al. | |
| 6,782,047 B1 | 8/2004 | Le et al. | |
| 6,804,238 B1 * | 10/2004 | Euget et al. | 370/392 |
| 6,882,637 B1 | 4/2005 | Le et al. | |
| 7,020,719 B1 * | 3/2006 | Grove et al. | 709/238 |
| 7,031,666 B2 | 4/2006 | Hsu | |
| 7,061,936 B2 | 6/2006 | Yoshimura et al. | |
| 7,170,863 B1 * | 1/2007 | Denman et al. | 370/260 |
| 2001/0005382 A1 * | 6/2001 | Cave et al. | 370/466 |
| 2002/0071432 A1 * | 6/2002 | Soderberg et al. | 370/389 |
| 2002/0089437 A1 | 7/2002 | Le et al. | |
| 2002/0097723 A1 | 7/2002 | Tourunen et al. | |
| 2003/0007512 A1 | 1/2003 | Tourunen et al. | |
| 2003/0026255 A1 * | 2/2003 | Poeluev et al. | 370/392 |
| 2004/0022252 A1 | 2/2004 | Jang et al. | |
| 2004/0071096 A1 * | 4/2004 | Na et al. | 370/252 |
| 2004/0081151 A1 * | 4/2004 | Greis et al. | 370/392 |
| 2006/0023652 A1 | 2/2006 | Vedantham et al. | |

FOREIGN PATENT DOCUMENTS

WO WO 00/49748 8/2000

(Continued)

OTHER PUBLICATIONS

M. Degermark, et al., "IP Header Compression", RFC 2507, The Internet Society, Feb. 1999, http://www.ietf.org/rfc/rfc2507.txt.

(Continued)

*Primary Examiner*—Philip B Tran
(74) *Attorney, Agent, or Firm*—Morgan & Finnegan, LLP

(57) ABSTRACT

A compression context for a plurality of packets is established with a receiving device. Each of these packets is associated with one or more reliable multicast protocols, such as the Layered Coding Transform (LCT) protocol, the Asynchronous Layered Coding (ALC) protocol, the FLUTE protocol, the MUPPET protocol, and the NACK-Oriented Reliable Multicast (NORM) protocol. Upon establishment of the compression context, a compressed packet is generated for one of the plurality of packets and transmitted to the receiving device. The compressed packet has a reduced number of bits in its header. Upon receipt, the receiving device decompresses the compressed packet based on the compression context.

46 Claims, 13 Drawing Sheets

FOREIGN PATENT DOCUMENTS

| WO | WO 01/35694 A2 | 3/2001 |
| WO | WO 01/28180 A2 | 4/2001 |
| WO | WO 01/35534 A2 | 5/2001 |
| WO | WO 01/50705 A1 | 7/2001 |
| WO | WO 01/67709 A2 | 9/2001 |
| WO | WO 02/25895 A1 | 3/2002 |
| WO | WO 02/33931 A1 | 4/2002 |
| WO | WO 02/080485 A1 | 10/2002 |
| WO | WO 03/003668 A1 | 1/2003 |

OTHER PUBLICATIONS

M. Luby, et al., "Asynchronous Layered Coding (ALC) Protocol Instantiation", RFC 3450; The Internet Society, Dec. 2002, http://www.ietf.org/rfc/rfc3450.txt, pp. 1-5.

M. Luby, et al., "Layered Coding Transport (LCT) Building Block", RFC 3451, The Internet Society, Dec. 2002, http://www.ietf.org/rfc/rfc3451.txt.

M. Luby, et al., "Forward Error Correction (FEC) Building Block", RFC 3452, The Internet Society; Dec. 2002, http://www.ietf.org/rfc/rfc3452.txt.

B. Adamson, et al., "NACK-Oriented Reliable Multicast Protocol (NORM)", The Internet Society, Mar. 2003, http://waterspring.org/pub/id/draft-ietf-rmt-pi-norm-06.txt.

C. Bormann, et al., "RObust Header Compression (ROHC): Framework and four profiles: RTP, UDP, ESP, and uncompressed", RFC 3095, The Internet Society, Jul. 2001, http://www.ietf.org/rfc/rfc3095.txt.

T. Paila, et al., "FLUTE—File Delivery over Unidirectional Transport", The Internet Society, Nov. 14, 2003, http://www.ietf.org/internet-drafts/draft-ietf-rmt-flute-06.txt.

T. Paila, et al., "FLUTE—File Delivery over Unidirectional Transport", The Internet Society, Jun. 11, 2003, http://www.watersprings.org/pub/id/draft-ietf-rmt-flute-00.txt.

J. Luoma, "MUPPET: Internet Media Guide Unidirectional Point-to-Multipoint Transport", The Internet Society, Jun. 30, 2003, http://www.watersprings.org/pub/id/draft-luoma-mmusic-img-muppet-02.txt.

Y. Nomura, et al., "A Framework for the Usage of Internet Media Guides". The Internet Society, Jun. 21, 2004, http://ietf.org/internet-drafts/draft-ietf-mmusic-img-framework-07.txt.

International Search Report (PCT/IB04/04098) dated Oct. 5, 2006.

* cited by examiner

| Version | C flag | Reserved | S flag | O flag | H flag | T flag | R flag | A flag | B flag | Header length | Codepoint |
|---|---|---|---|---|---|---|---|---|---|---|---|
| Congestion control information (CCI) ||||||||||||
| Transport Session Identifier (TSI) ||||||||||||
| Transport Object Identifier (TOI) ||||||||||||
| Sender Current Time ||||||||||||
| Expected Residual Time ||||||||||||
| Header Extensions (if any) ||||||||||||

FIG. 6

| Version | C flag | Reserved | S flag | O flag | H flag | T flag | R flag | A flag | B flag | Header length | Codepoint |

Congestion control information (CCI)

Transport Session Identifier (TSI)

Transport Object Identifier (TOI)

Sender Current Time

Expected Residual Time

Header Extensions (if any)

FEC payload ID

FIG. 7

METHOD AND SYSTEM FOR HEADER COMPRESSION

FIELD OF THE INVENTION

The present invention relates to packet-based communications. More particularly, the present invention relates to techniques for compressing packets.

BACKGROUND OF THE INVENTION

In wireless communications systems, such as cellular networks, bandwidth is often a valuable resource that should be conserved. Thus, there is a need for compression techniques. Currently, there are known compression techniques that are suitable for the compression of arbitrary data units, such as protocol packet payloads. These techniques involve compression algorithms, which vary from being mathematical (e.g., gzip) to grammatical (e.g., SDP dictionaries translating text fields to a bit encoded format).

In the case of Internet Protocol (IP) based communications, overhead associated with packet headers consumes a considerable amount of communications bandwidth. For instance, an Internet Protocol, version 4 (IPv4) packet header requires 20 bytes, while an Internet Protocol, version 6 (IPv6) packet header requires 40 bytes. To address the amount of bandwidth consumed by packet headers, specialized compression schemes have been developed that are more effective on packet headers than general-purpose compression algorithms. In particular, specialized schemes have been developed for UDP/IP, ESP/IP and RTP/UDP/IP packets. For instance, one known header compression scheme is Robust Header Compression (ROHC). Another known header compression scheme is disclosed in M. Degermark et al., "IP Header Compression," RFC 2507, The Internet Society, February 1999 ("RFC 2507"). This document is incorporated herein by reference in its entirety and may be downloaded from http://www.ietf.org/rfc/rfc2507.txt.

However, existing work on packet header compression has focused on audio/video streaming services such as Voice over IP employing RTP/UDP/IP transport. To this end, header compression is a known technique, especially for IP streaming where RTP/UDP/IP headers may be compressed from around 60 bytes to below 5 bytes.

The Reliable Multicast Transport (RMT) Working Group of the Internet Engineering Task Force (IETF) is in the process of standardizing two categories of error-resilient multicast transport protocols. In the first category, reliability is provided through the use of forward error correction (FEC). In the second category, reliability is provided through the use of receiver feedback. Asynchronous Layered Coding (ALC) is a protocol instantiation belonging to the first category, while the NACK-Oriented Reliable Multicast (NORM) protocol belongs to the second category. These protocols employ UDP and IP protocols and may be used in various types of wireless multiple-access networks such as UMTS, WLAN, DVB-T and DVB-S.

The ALC and NORM protocols are designed for the delivery of discrete binary objects, such as downloadable files. When deployed on wireless networks, it is desirable for these protocols to conserve bandwidth. Packet payload compression schemes such as gzip can be readily used for RMT protocols. However, the current options for compressing the headers of these protocol packets are limited. At best, ROHC only compresses UDP/IP portions of these packets. Also, the IP header compression scheme of RFC 2507 only compresses the headers of the IP protocol. In addition, this protocol has problems with transmission errors. Another compression mechanism, known as DEFLATE also causes problems with transmission errors because it does not provide any support for error recovery.

SUMMARY OF THE INVENTION

The present invention is directed to a method, system, and computer program product for the transmission of packets. The method, system, and computer program product establish with a receiving device a compression context for a plurality of packets. Each of these packets is associated with one or more reliable multicast protocols and includes a header having a plurality of header fields. Upon establishment of the compression context, a compressed packet is generated and transmitted to the receiving device. The compressed packet has a reduced number of bits in its header.

The reliable multicast protocol(s) may include, for example, the Layered Coding Transform (LCT) protocol, the Asynchronous Layered Coding (ALC) protocol, the FLUTE protocol, the MUPPET protocol, and the NACK-Oriented Reliable Multicast (NORM) protocol.

The method, system, and computer program product may also identify one or more header fields as compressible. For instance, each of a plurality of header fields may be placed into one of a plurality of categories. These categories may include a first category for header fields that do not change at all, a second category for header fields that change only occasionally, and a third category for header fields that change from packet-to-packet.

The present invention is further directed to a method, system, and computer program product for the reception of packets. This method, system, and computer program product establish a compression context for a plurality of packets with a transmitting device. These packets are each associated with a reliable multicast protocol (e.g., LCT, ALC, FLUTE, MUPPET, and/or NORM). Upon establishment of the compression context, a compressed packet having a reduced number of bits in its header is received from the transmitting device. This compressed packet is then decompressed based on the compression context.

The present invention advantageously provides for the efficient utilization of communications bandwidth. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 6 is a diagram of an Layered Coding Transform (LCT) header;

FIG. 7 is a diagram of an Asynchronous Layered Coding (ALC) header;

DETAILED DESCRIPTION OF THE PREFERRED EMBODIMENTS

I. Operational Environment

Before describing the invention in detail, it is helpful to describe environments in which the invention may be used. Accordingly, FIGS. 1 and 2 are block diagrams of operational environments where header compression techniques are employed to conserve communications bandwidth.

Figure 1:
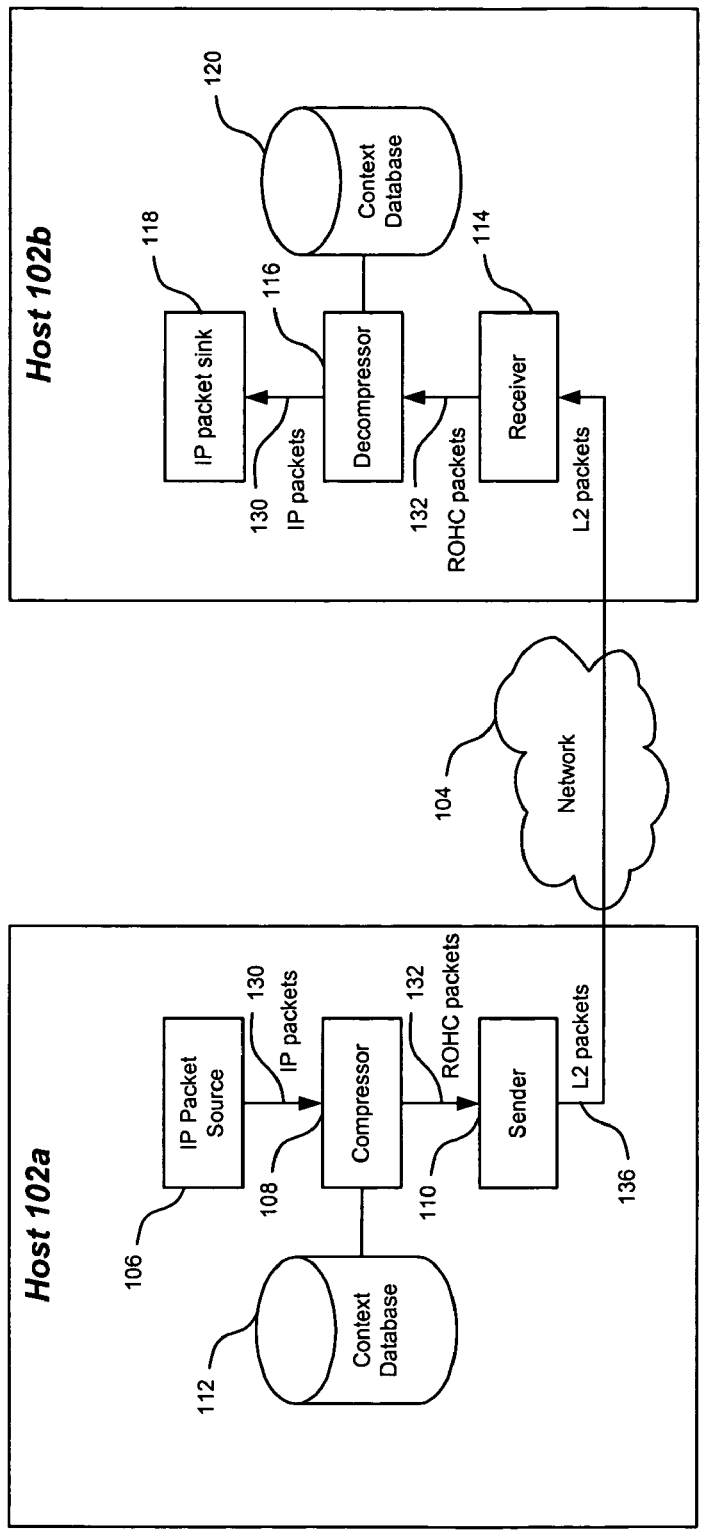
FIGS. 1 and 2 are block diagrams of exemplary operational environments.
Figure 2:
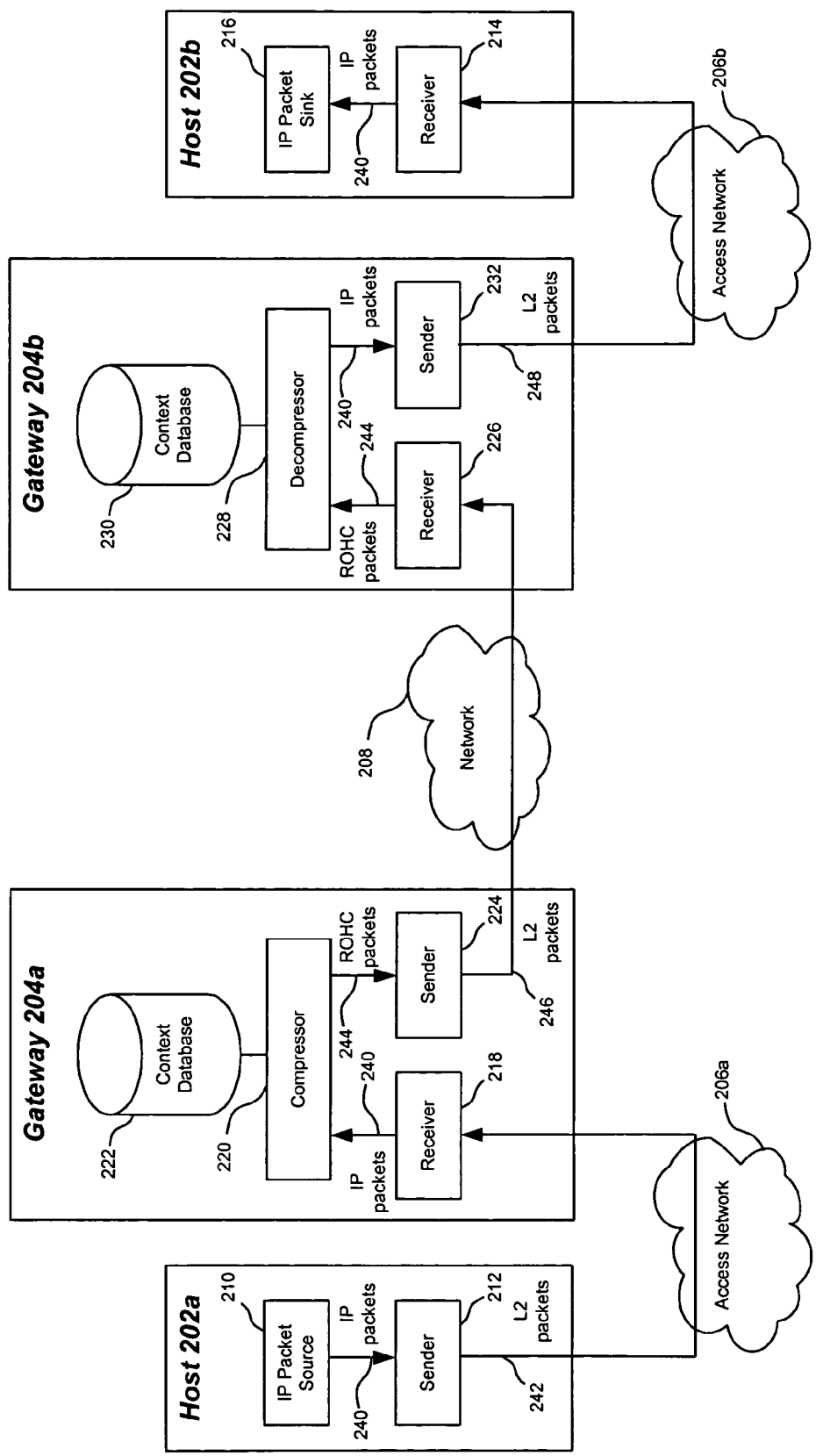

FIG. 1 shows an environment in which a first host 102a transmits packets across a packet-based network 104 to a second host 102b. To conserve the bandwidth of network 104, header compression is performed on these packets. This compression may be in accordance with various techniques, such as the ones described herein. Accordingly, host 102a compresses the protocol headers of one or more of the packets sent to host 102b. Upon receipt, host 102b decompresses these headers.

FIG. 1 shows that host 102a includes an Internet Protocol (IP) packet source 106, a compressor 108, a sender 110, and a compression context database 112. Host 102b includes a receiver 114, a decompressor 116, an IP packet sink 118, and a compression context database 120.

IP packet source 106 places information into one or more IP packets 130. This information may be received, for example, from higher layer protocols or an application (not shown). Accordingly, packets 130 may include one or more headers, each header being associated with a particular protocol. Examples of such protocols include ALC, LCT, FLUTE, MUPPET, NORM, UDP, and IP.

As shown in FIG. 1, compressor 108 receives packets 130 and compresses them to produce compressed packets 132. Sender 110 encapsulates compressed packets 132 into one or more layer two (i.e., link layer) packets or frames 136, which are transmitted across network 104 to host 102b.

Host 102b includes a receiver 114, a decompressor 116, an IP packet sink 118, and a context database 120. Receiver 114 extracts the encapsulated compressed packets 132 from link layer packets 136. Decompressor 116 performs header decompression on these compressed packets to recover IP packets 130. IP packet sink 118 may include one or more higher layer protocols and applications (not shown), which process packets 130.

Network 104 provides a connection between hosts 102a and 102b. Accordingly, network 104 may include a wireless local area network (WLAN) link or an Ethernet switch.

In the environment of FIG. 1, the operation of both compressor 108 and decompressor 116 are controlled by compression-related state information, known as compression contexts. These contexts are stored in context databases 112 and 120.

The environment of FIG. 2 is similar to the environment of FIG. 1. However, this environment includes hosts 202a and 202b, which do not perform header compression and decompression. Rather, in this environment, header compression/decompression operations are performed by gateways 204a and 204b.

As shown in FIG. 2, each host 202 communicates with a corresponding gateway 204 via an access network 206. More particularly, host 202a communicates with gateway 204a via an access network 206a, while host 202b communicates with gateway 204b via an access network 206b. Gateways 204a and 204b communicate across a packet-based network 208.

Host 202a includes an IP packet source 210, which places information into one or more IP packets 240. This information may be received, for example, from higher layer protocols or an application (not shown). Host 202a also includes a sender 212 to encapsulate packets 240 into one or more layer two (i.e., link layer) packets or frames 242, which are transmitted across access network 206a to gateway 204a.

As shown in FIG. 2, gateway 204a includes a receiver 218, a compressor 220, a compression context database 222, and a sender 224. Receiver 218 receives packets 242 from access network 206a and extracts encapsulated IP packets 240 from them. Compressor 220 compresses IP packets 240 to produce compressed packets 244. Sender 224 encapsulates compressed packets 244 into one or more layer two packets or frames 246, which are transmitted across network 208 to gateway 204b.

Gateway 204b includes a receiver 226, a decompressor 228, a compression context database 230, a decompressor 228, and a sender 232. Receiver 226 receives packets 246 from network 208 and extracts compressed packets 244 from them. Decompressor 228 decompresses compressed packets 244 into IP packets 240. Sender 232 encapsulates IP packets 240 into link layer packets 248, which are sent to host 202b.

Host 202b includes a receiver 214 and an IP packet sink 216. Receiver 214 extracts the encapsulated IP packets 240 from link layer packets 248. IP packet sink 216 may include one or more higher layer protocols and applications (not shown), which process packets 240.

In the environment of FIG. 2, the operation of both compressor 220 and decompressor 228 are controlled by compression contexts, which are stored in context databases 222 and 230.

The environments of FIGS. 1 and 2 are described in the context of one host 102 or gateway 204 acting in a compression role, while another host 102 or gateway 204 acts in a decompression role. However, each host 102 or gateway 204 may act in either or both of these roles. Moreover, in the environments of FIGS. 1 and 2, networks 104, 206, and 208 may involve various types of technologies. For example, one or more of these networks may include local area networks (LANs), such as Ethernet and/or larger network infrastructures, such as the Internet. Also, one or more of these networks may utilize wireless technologies. For instance, these networks may include wireless LANs (e.g., IEEE 802.11) and/or other short-range communications networks, such as Bluetooth. Further, these networks may include cellular-based infrastructures, such as GSM, Enhanced Data GSM Environment (EDGE), IS-95, and/or General Packet Radio Service (GPRS).

II. ROHC Compression

RObust Header Compression (ROHC) is a technique for reducing the amount of headers transmitted over bandwidth limited channels. ROHC is described in C. Burmeister et al., "RObust Header Compression (ROHC): Framework and four profiles: RTP, UDP, ESP, and uncompressed," RFC 3095, The Internet Society July 2001 ("RFC 3095"). This document is incorporated herein by reference in its entirety and may be downloaded from http://www.ietf.org/rfc/rfc3095.txt.

Figure 3:
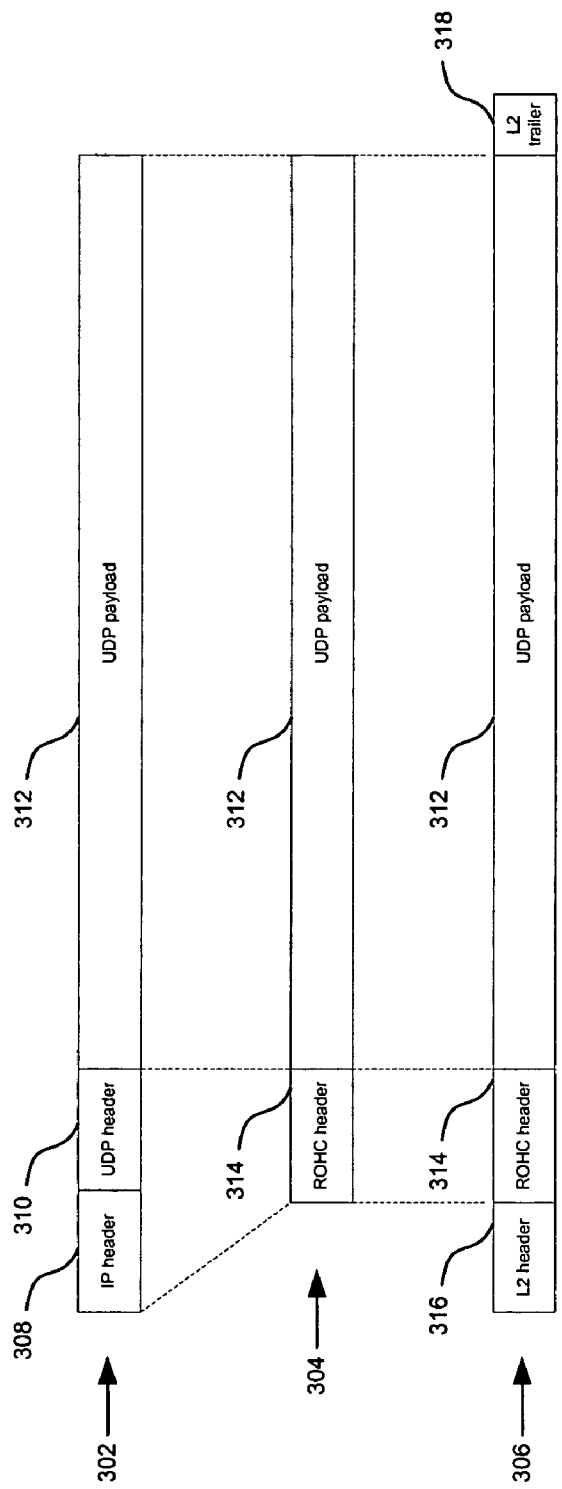
FIG. 3 is a diagram showing ROHC compression of a UDP packet.

FIG. 3 is a diagram showing ROHC compression of a UDP packet. This compression begins with an uncompressed IP packet 302, which includes an IP header 308, a UDP header 310, and a UDP payload 312. Through ROHC compression techniques, a compressed ROHC packet 304 is generated from IP packet 302. As shown in FIG. 3, compressed ROHC packet 304 includes an ROHC header 314 and UDP payload 312. ROHC header 314 is generated by compressing one or more fields in IP header 308 and UDP header 310.

In order to transmit compressed ROHC packet 304 across a network, a layer two packet 306 is generated from compressed ROHC packet 304. Layer two packet 306 includes UDP payload 312, a layer two header 316, and a layer two trailer 318.

Figure 4:
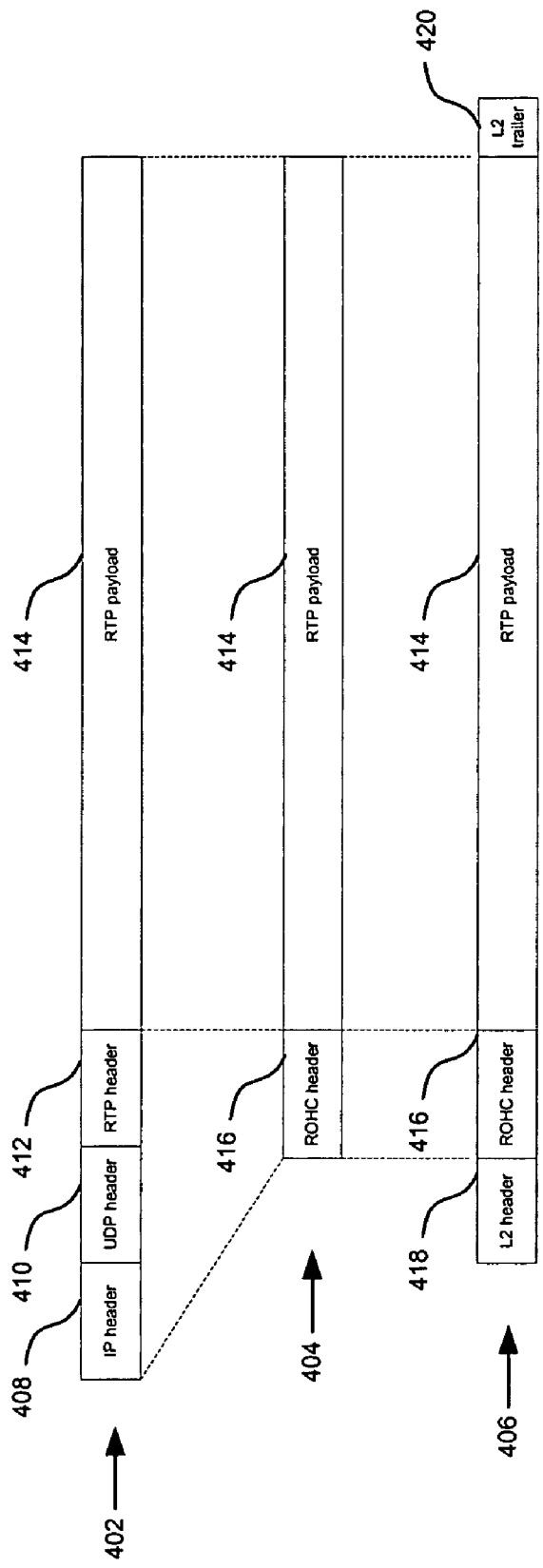
FIG. 4 is a diagram showing ROHC compression of an RTP packet.

FIG. 4 is a diagram showing ROHC compression of an RTP packet. This compression begins with an uncompressed IP packet 402. As shown in FIG. 4, IP packet 402 includes an IP header 408, a UDP header 410, an RTP header 412, and an RTP payload 414. Through ROHC compression techniques, a compressed ROHC packet 404 is generated from IP packet 402. FIG. 4 shows that compressed ROHC packet 404 includes an ROHC header 416 and RTP payload 414. ROHC header 416 is generated by compressing one or more fields in IP header 408, UDP header 410, and RTP header 412.

From compressed ROHC packet 404, a layer two packet 406 is generated for transmission. Layer two packet 406 includes RTP payload 414, a layer two header 418, and a layer two trailer 420.

RFC 3095 defines four different profiles: an uncompressed profile, an RTP profile, a UDP profile and an ESP profile. In addition, RFC 3095 defines three operational modes. These modes are a unidirectional mode, a bidirectional optimistic mode, and a bidirectional reliable mode. The employed mode controls the logic of transitions between various states as well as actions performed in each of these states. These states described below with reference to FIG. 5.

When operating in the unidirectional mode, packets are only sent in the direction from a compressor to a decompressor. This mode therefore makes ROHC suitable for communications environments where a return path from a decompressor to a compressor is not available.

ROHC is based on defining a compression context for both the compressor (also referred to herein as a transmitter or sender) and its corresponding decompressor (also referred to herein as a receiver). This context includes a static part that does not change for a stream of packets and a dynamic part that may change for a stream of packets. The dynamic part includes header fields that change from packet to packet. Such header fields must be sent in every packet. Depending on a dynamic field's compression possibilities, it may be transmitted in compressed form or "as is". In contrast, the static part includes header fields that are either constant or change in a predictable manner. Accordingly, the static part may be compressed or even eliminated.

Figure 5:
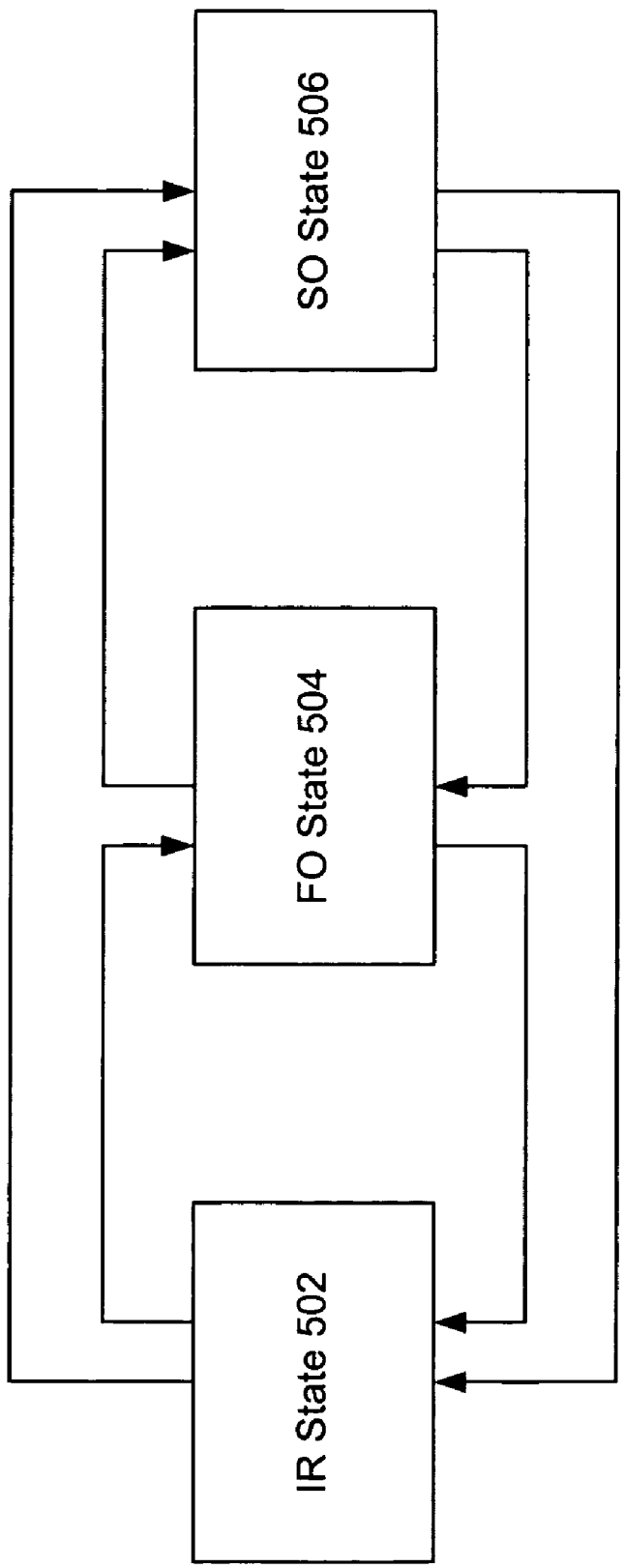
FIG. 5 is a diagram illustrating ROHC operational states.

FIG. 5 is a diagram illustrating various ROHC operational states. As shown in FIG. 5, an ROHC compressor may operate in three states. These states include an initialization and refresh (IR) state 502, a first order (FO) state 504, and a second order (SO) state 506. FIG. 5 also shows various transitions between these states. In the unidirectional mode, transitions between the states of FIG. 5 only occur when certain time periods have elapsed or when certain irregularities in the header fields exist. This is because the decompressor provides no feedback to the compressor in the unidirectional mode.

During operation, the compressor starts in IR state 502, the compressor sends packets with the complete header information (both static and dynamic fields). In addition, the compressor may optionally analyze the packet headers to determine which header fields can be compressed. By observing the packets transmitted in IR state 502, the compressor and decompressor are able to store information, such as header field reference values as well as patterns of change for header fields. These reference values and patterns of change establish a compression context for the compressor and decompressor.

This compression context is identified by a compression context identifier (CID). The CID may be included in header-compressed packets to differentiate between multiple compression contexts used on the same transport channel. However, the CID may be left out of these packets if only one context is used on a transport channel. The CID may be delivered in several different ways, either in-band (in the compressed headers) or out-of-band.

After sending enough packets to allow the receiver to learn the values of the static fields and the pattern of change in dynamic fields, the transmitter enters either FO state 504 or SO state 506.

In FO state 504, the compressor sends one or more packets (referred to herein as FO packets) containing a sequence number and information on one or more (typically not all) changed header fields. Most of this information is in the form of "deltas" between the value of the field in the current and the most recently transmitted packet. These deltas are usually at least partially compressed. However, in FO state 504, some information (such as irregularities) are transmitted in uncompressed form. Decompressors are able to reproduce any fields not included in an FO packet (such as static fields) based on the compression context or the combination of the compression context and the packet's sequence number.

The compressor enters FO state 504 when irregular or infrequent changes occur in some header fields. As a result of such changes, the compression context is updated at the compressor and the decompressor. After sending enough packets to allow the decompressor to learn the new change pattern in header fields, the compressor typically transits from FO state 504 to SO state 506. However, when error conditions occur, the compressor enters IR state 502.

In SO state 506, the compressor provides an optimal header compression by just sending a sequence number instead of the actual values of the packet header fields. In this state, decompressors are able to reproduce static fields based on the compression context, and dynamic fields based on the combination of the compression context and the sequence number. Accordingly, SO state 506 can only be used when there are no unexpected changes in any of the header fields.

The compressor remains in SO 506 state until the expiration of a timer or a sequence counter, or until a major change occurs in the header patterns of the packets being transmitted. From SO state 506, the compressor may enter either FO state 504 or IR state 502. A transition to the IR state 502 may be triggered by packet loss rates that are estimated by the compressor or reported by decompressors.

ROHC basically defines five types of packets to provide flexible communication tools to transfer the dynamic and static parts of header information. These packet types are IR packets, IR dynamic (IR-DYN) packets, type 0 packets, type 1 packets, and type 2 packets.

IR packets are the largest of the packet types and contain all the static information of the header fields. IR packets may also contain the dynamic part, but this is not required. These packets are used in the beginning to initialize the context and after the periodical transitions to IR state. IR dynamic (IR-DYN) packets contain all the dynamic data of the headers.

Type 0 packets are the most compressed packets defined for ROHC. These packets contain only a compressed RTP (or ROHC specific in non RTP profiles) sequence number, a cyclical redundancy check (CRC), and generally a context ID that specifies the particular context. The context ID is left out of the header if its value is zero. Thus, in this case, absence of the field tells the decompressor the correct value.

Type 1 packets are longer than type 0 packets. Type 1 packets are used if the compressed sequence number needs more bits than available in the type 0 header, or if an irregular change occurs in either the IPv4 Identification (IP-ID) field or the RTP timestamp. The header contains also (possible) context ID and longer CRC than type 0 header. It is also possible to include extensions to one subtype of this packet (the one containing IP-ID) if other fields need updates. More details on this packet can be found in RFC 3095.

Type 2 packets are the largest of these compressed packets. This packet type has even more bits available for the compressed sequence number, has even larger CRCs, and contains either a compressed update of the IP-ID or the RTP timestamp. All the subtypes of the packet can have extensions attached. More information about the type 2 packets and the available extensions are disclosed in RFC 3095.

After initializing the context and the first transition to SO state 506, the compressor should always select the packet type that sends all the necessary information but does not contain anything redundant. The only exception to this rule exists in the unidirectional mode. More particularly, the unidirectional mode involves periodical transitions to IR state 504 and FO state 506 so that the compressor may send initialization data in case the decompressor has lost the context (there is no return path and hence no feedback from the decompressor to the compressor).

According to ROHC, compressed headers are encoded for transmission using a minimal or reduced number of bits for each compressed field compared to the original field. For static fields, the length of the compressed field is zero bits. However, for other compressed fields, the compressor may employ variable length encoding (VLE). VLE encodes the length of the field in the field itself.

VLE is based on the observation that fields from consecutive headers often tend to have the same most significant bits (MSBs) and differ only by their least significant bits (LSBs). Accordingly, VLE is achieved by transmitting only the differing least significant bits from a header field.

A specific VLE example employs a mathematical function dependent on a number of transmitted LSBs and a reference value. This reference value may be based on a previous header field value, such as the header field value from the most recently transmitted packet. Such a function is shown below in Equation (1).

$$f(k, v\_ref) = (v\_1, v\_2, \ldots, v\_2^k) \quad (1)$$

In Equation (1), k represents a transmitted number of bits in a VLE compressed header field, and v_ref represents a reference value for the corresponding header field. Each combination of k and v_ref provides a set of possible header field values (i.e., $v\_1, v\_2, \ldots v\_2^k$). Upon receipt of a VLE compressed field, the receiver may employ the function of Equation (1) to determine the header field value corresponding to the transmitted k-bits. This determination may involve finding the header field value of Equation (1) having k LSBs that match the transmitted k-bits. Examples of such VLE compression techniques are described in International Publication Number WO 01/35534 A2 (incorporated herein by reference in its entirety).

In embodiments, VLE compressed header fields may be further compressed through techniques, such as Huffman encoding. Huffman encoding is a statistical based compression technique in which the probability of a symbol (i.e., one or more bits) has a direct bearing on the length of its compressed representation.

For each compression context, the transmitter typically sends a series of packets, providing an identifier such as a sequence number for identifying the position of each transmitted packet within a sequence. Such a sequence is called a compression window. One or more packets in the beginning of a compression window are transmitted without header compression (i.e., in IR state 502). This provides an initial reference for the compressed packet headers.

As more packets are transmitted, previously transmitted packets are used as the reference for header compression. Typically, such a reference packet is the packet transmitted just before the current packet. However, any of the packets transmitted within a given compression window can be used as a reference.

The sequence number for enumerating packets within a compression window may be provided in various ways. For instance, the sequence number may be provided explicitly in the ROHC header. Alternatively, the sequence number may be provided by a sequence counter field in any of the protocol headers being compressed (e.g., the sequence count field of RTP or FLUTE). In ROHC, the sequence number itself is compressed using techniques such as VLE.

The length of the compression window is inversely proportional to the efficiency of compression. Thus, to increase compression efficiency, the size of the compression window must be periodically reduced. This may be achieved by either discarding the oldest packets in the sequence or by entering IR state 502 to start a new sequence. In ROHC, older packets are discarded from the compression window as the receiver acknowledges the reception of those packets.

III. Multicast Transmission

The present invention provides for header compression techniques for various reliable multicast protocols. Four such multicast protocols are Asynchronous Layered Coding (ALC), File Delivery over Unidirectional Transport (FLUTE), Internet Media Guide Unidirectional Point-to-Multipoint Transport (MUPPET), and NACK-Oriented Reliable Multicast (NORM).

A. ALC

ALC is a protocol described in M. Luby et al., "Asynchronous Layered Coding (ALC) Protocol Instantiation," RFC 3450, The Internet Society, December 2002 ("RFC 3450"). This document is incorporated herein by reference in its entirety and may be downloaded from http://www.ietf.org/rfc/rfc3450.txt.

ALC provides congestion controlled reliable asynchronous delivery of content to an unlimited number of concurrent receivers from a single sender. This is performed by utilizing a Layered Coding Transport (LCT) building block, a multiple rate congestion control building block, and a Forward Error Correction (FEC) building block. ALC is designed to be used with the IP multicast network service and does not require feedback packets from receivers to the sender. Information, referred to as objects, are transferred from a sender to one or more receivers in an ALC session.

ALC can support several different reliable content delivery service models. One such model is called the push service model, involves the concurrent delivery of objects to a selected group of receivers. Another model is called the on-demand content delivery service model. In this model, a sender transmits an object (e.g., software) for a time period. During this time period, receivers may join the session and recover the object. This time period may be much longer in duration than the time required for a receiver to download the object. Thus, receivers join the session during such a time period and leave the session when they have received enough packets to recover the object. Such sessions are identified by a session description, which may be obtained, for example, through a web server.

ALC uses a packet format that includes a UDP header followed by an LCT header, an FEC payload ID, and a packet payload. This arrangement is shown in FIGS. 6 and 7.

LCT is described in Luby, et al., "Layered Coding Transport (LCT) Building Block", RFC 3451, The Internet Society, December 2002. This document may be downloaded from http://www.ietf.org/rfc/rfc3451.txt. LCT provides transport level support for reliable content delivery and stream delivery protocols.

An LCT session includes one or more related LCT channels that originate at a single sender. The channels are used for a period of time to convey packets containing LCT headers. These packets may be received by one or more receivers. Although LCT requires a connection from a sender to receiver(s), it does not require a connection from the receiver(s) to the sender. Accordingly, LCT may be used for both unicast and multicast delivery.

FIG. 6 is a diagram of an LCT header, showing that the LCT header includes various fields. These fields are described in Table 1, below.

TABLE 1

| LCT Header Fields | | |
|---|---|---|
| Field Name | Size | Description |
| LCT version number (V) | 4 bits | Indicates the LCT version number. Currently, the version number is 1. |
| Congestion control flag (C) | 2 bits | C = 0 indicates the Congestion Control Information (CCI) field is 32-bits in length. C = 1 indicates the CCI field is 64-bits in length. C = 2 indicates the CCI field is 96-bits in length. C = 3 indicates the CCI field is 128-bits in length. |
| Reserved (r) | 2 bits | Reserved for future use |
| Transport Session Identifier flag (S) | 1 bit | This is the number of full 32-bit words in the TSI field. The TSI field is 32*S + 16*H bits in length, i.e. the length is either 0 bits, 16 bits, 32 bits, or 48 bits. |
| Transport Object Identifier flag (O) | 2 bits | This is the number of full 32-bit words in the TOI field. The TOI field is 32*O + 16*H bits in length, i.e., the length is either 0 bits, 16 bits, 32 bits, 48 bits, 64 bits, 80 bits, 96 bits, or 112 bits. |
| Half-word flag (H) | 1 bit | This allows the TSI and TOI field lengths to be multiples of a half-word (16 bits), |
| Sender Current Time present flag (T): | 1 bit | Indicates whether the Sender Current Time (SCT) field is present |
| Expected Residual Time present flag (R) | 1 bit | Indicates whether the Expected Residual Time (ERT) field is present |

TABLE 1-continued

| LCT Header Fields | | |
|---|---|---|
| Field Name | Size | Description |
| Close Session flag (A) | 1 bit | Indicates whether termination of transmission of packets for the session is imminent. |
| Close Object flag (B) | 1 bit | Indicates whether termination of transmission of packets for an object is imminent. |
| LCT header length (HDR_LEN) | 8 bits | Total length of the LCT header in units of 32-bit words. This value may be inferred from other fields in the LCT header. |
| Codepoint (CP) | 8 bits | An identifier which is passed to the packet payload decoder to convey information regarding the codec being used for the packet payload. This field is either static or changes infrequently during a session. |
| Congestion Control Information (CCI) | 32, 64, 96 or 128 bits | Used to carry congestion control information, such as layer numbers, logical channel numbers, and sequence numbers. This field is not specified by LCT and is likely to change predictably. |
| Transport Session Identifier (TSI) | 0, 16, 32 or 48 bits | Identifies a session among all sessions from a particular sender. Thus, this field is static during a session. |
| Transport Object Identifier (TOI) | 0, 16, 32, 48, 64, 80, 96 or 112 bits | Identifies a specific object inside the session. If the session contains only one object, this field is not included. This field is either static (not present) or changes infrequently as the object changes. |
| Sender Current Time (SCT) | 0 or 32 bits | Included if T = 1, this field indicates the current clock at the sender at the time this packet was transmitted. This field is optional. If used in every packet it is compressible. However, this field may be included infrequently or completely left out of the LCT header. When completely left out, this field is static. |
| Expected Residual Time (ERT) | 0 or 32 bits | Included if R = 1, this field represents the expected transmission time for the current session or the current object. This field is optional. If included in every packet, it may be compressed. This field may also be included infrequently or completely left out of the LCT header. In the latter case, this field is static. |
| Header Extensions | Variable length | This field may contain various extensions for LCT. Compression of this field depends on the included extensions. |

Table 1 indicates that the CCI field is used to carry congestion control information, such as layer numbers, logical channel numbers, and sequence numbers. The CCI field may include various elements, such as a packet sequence number (PSN) that is incremented between each consecutive ALC/LCT packet, a current time slot index (CTSI) that is incremented periodically with a constant time interval, and a channel number (CN) that conveys a label varying within the range of at most 255 different values. In embodiments of the present invention, these fields may be handled by an ROHC mechanism.

FIG. 7 is a diagram of an ALC header. As described above, ALC utilizes LCT as a building block. Accordingly, this diagram shows that the ALC header includes the LCT fields of FIG. 6, as well as an FEC payload ID field. FEC payload ID field identifies the encoding symbol(s) in the payload of the packet. This field is in a format described in Luby et al., "Forward Error Correction (FEC) Building Block", RFC 3452, The Internet Society, December 2002. This document is incorporated herein by reference in its entirety and may be downloaded from http://www.ietf.org/rfc/rfc3452.txt. A brief description of this field is provided below in Table 2.

TABLE 2

ALC Header Fields

| Field Name | Size | Description |
| --- | --- | --- |
| FEC payload ID | Variable length | This field identifies the encoding symbol(s) in the payload of the packet. The format of this field depends on the chosen FEC code and its specification. This field must be included in every packet. |

B. FLUTE

FLUTE is a protocol that builds on ALC to provide for the unidirectional delivery of files over the Internet. FLUTE is described in the Internet Draft by Paila, et al., entitled "FLUTE—File Delivery over Unidirectional Transport," Nov. 14, 2003. This document is incorporated herein by reference and may be downloaded from http://www.ietf.org/internet-drafts/draft-ietf-rmt-flute-06.txt.

In particular, FLUTE provides for the signaling and mapping of properties of files to ALC concepts so that receivers may assign those parameters for received objects. According to FLUTE, files may be transferred to one or more receivers during a file delivery session. These files may include file delivery tables. A file delivery table describes various attributes associated with a particular file. For a given file, examples of such attributes include an object identifier value representing the file, forward error correction encoding information, file location, file name, MIME media type of the file, size of the file, and encoding of the file.

To start receiving a file delivery session, the receiver obtains transport parameters associated with the session. The receiver then joins the session's channel(s) to receive ALC/LCT packets associated with the session. These ALC/LCT packets are demultiplexed according to their object identifiers and stored so that the corresponding files may be recovered. At least one of these files is an FDT, which is stored in the receiver's FDT database. When other files are received, the receiver accesses its FDT database to assign properties according to the corresponding FDT database entry.

Figure 8:
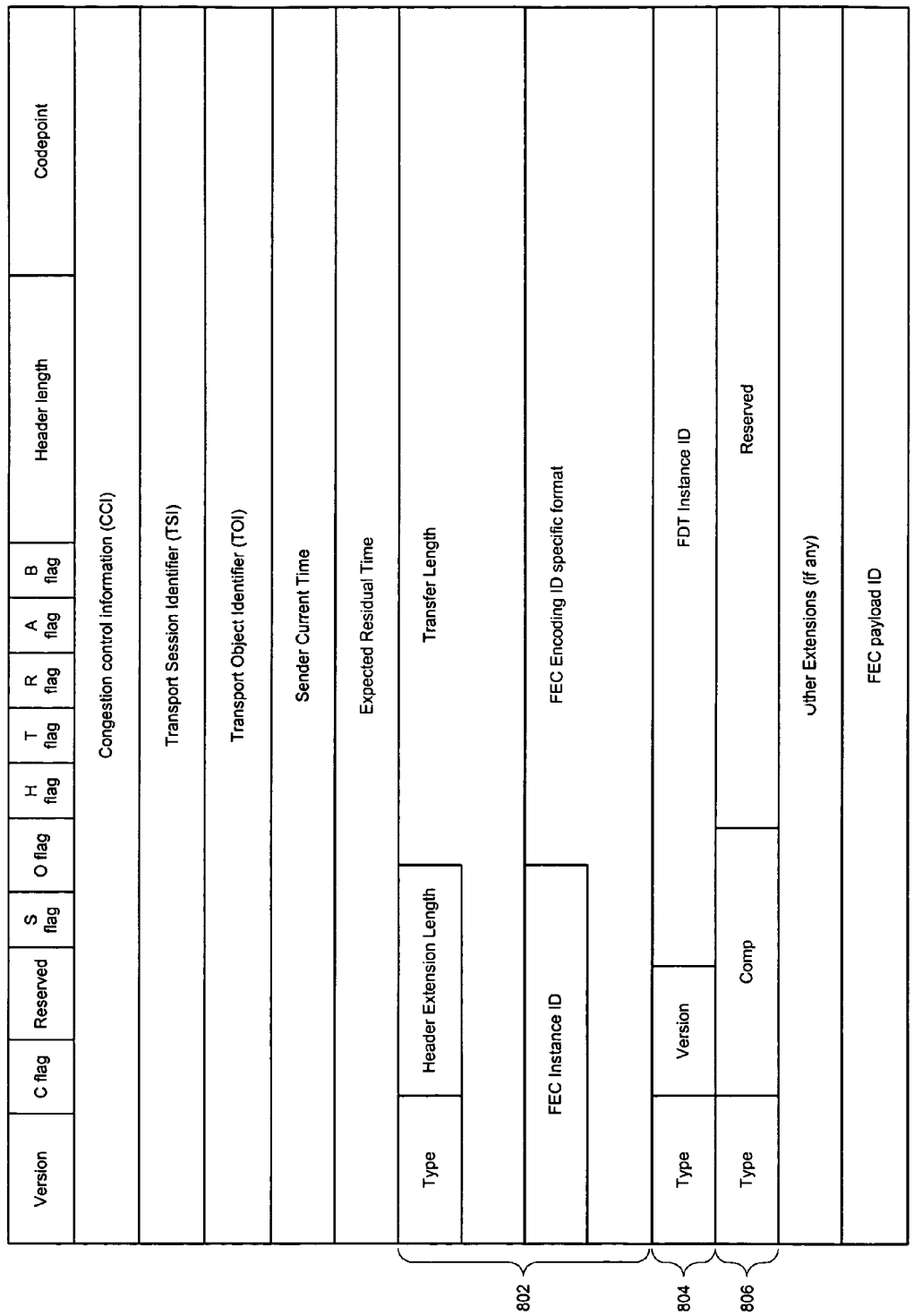
FIG. 8 is a diagram of a File Delivery over Unidirectional Transport (FLUTE) header.

FIG. 8 is a diagram showing various fields of a FLUTE header. These fields include LCT and ALC header fields of FIGS. 6 and 7. In addition, the FLUTE header includes an FEC Object Transmission Information Extension portion 802, an FDT Instance Extension portion 804, and an FDT Instance Compression Extension portion 806.

FDT Instance Extension portion 804 is used to indicate the transmission of FDT information. FEC Object Transmission Information Extension portion 802 is used to convey FEC coding information, such as the employed FEC coding method.

As shown in FIG. 8, FEC Object Transmission Information Extension portion 802, FDT Instance Extension portion 804, and FDT Instance Compression Extension portion 806 each include multiple fields. Descriptions of these fields are provided below in Table 3.

TABLE 3

FLUTE Header Fields

| Field Name | Size | Description |
| --- | --- | --- |
| Type (in FEC Object Transmission Information Extension portion) | 8 bits | In one embodiment of the invention, this field is set to 64 for FDI instance extension. |
| Header extension length (HEL) | 8 bits | The length of the header extension can be inferred from information included in the extension. |
| Transfer Length | 48 bits | Provides the length of the object in bytes. This field infrequently changes with objects. |
| FEC Instance ID | 16 bits | This field is optional. |
| FEC Encoding ID specific format | Variable length | Encoding parameters of the FEC encoding scheme. |
| Type (in FDT Instance Extension portion) | 8 bits | In one embodiment of the invention, this field is set to 192 to signify FDT instance extension. |
| Version | 4 bits | Version number of FLUTE. |
| FDT Instance ID | 24 bits | This field identifies a specific FTD instance. |
| Type (in FDT Instance Compression Extension portion) | 8 bits | In one embodiment of the invention, this field is set to 193 for FDT Instance Compression Extension. |
| Comp | 8 bits | Compression algorithm used in FDT Instance payload. |
| Reserved | 16 bits | Reserved for future use, set to zero. |

In FLUTE, the FEC Encoding ID (8 bits) is carried in the Codepoint field of the ALC/LCT header. FEC Encoding IDs 0, 128 and 130 are presently specified by FLUTE. As indicated in Table 3, the FEC Instance ID field is optional. This field is used for FEC Instance ID. However, it is only present if the value of the FEC Encoding ID is in the range of 128-255. When the value of the FEC Encoding ID is in the range of 0-127, this field is set to 0. Different FEC encoding schemes will need different sets of encoding parameters. Thus, the structure and length of this field depends on the FEC Encoding ID.

C. MUPPET

MUPPET is a unidirectional point-to-multipoint transport protocol for the delivery of Internet Media Guide (IMG) metadata. MUPPET is described in the Internet Draft by J. Luoma, entitled "MUPPET: Internet Media Guide Unidirectional Point-to-Multipoint Transport," Jun. 30, 2003. This document is incorporated herein by reference and may be downloaded from http://www.watersprings.org/pub/id/draft-luoma-mmusic-img-muppet-02.txt.

MUPPET is based on ALC and uses IP multicast delivery to provide an IMG descriptor transport service. More particularly, MUPPET provides an IMG sender with unidirectional transport for its IMG metadata within an IMG session, which includes one or more IMG channels. Each IMG channel is implemented as a separate ALC session. MUPPET re-uses the packet format of ALC. Thus, the payload of the MUPPET protocol (e.g., IMG descriptor tables and IMG objects), are conveyed as ALC encoding symbols.

D. NORM

NACK-Oriented Reliable Multicast Protocol (NORM) provides reliable transport of bulk data objects or streams over generic IP multicast routing and forwarding services. NORM uses a selective, negative acknowledgement mechanism for transport reliability and offers additional protocol mechanisms to conduct reliable multicast sessions with limited "a priori" coordination among senders and receivers. NORM also provides congestion control feature to promote sharing of network bandwidth with other transport protocols such as Transmission Control Protocol (TCP).

NORM is described in the Internet Draft by B. Adamson, entitled "NACK-Oriented Reliable Multicast Protocol (NORM)," March, 2003. This document is incorporated herein by reference and may be downloaded from http://watersprings.org/pub/id/draft-ietf-rmt-pi-norm-06.txt.

IV. Multicast Header Compression

Figure 9:
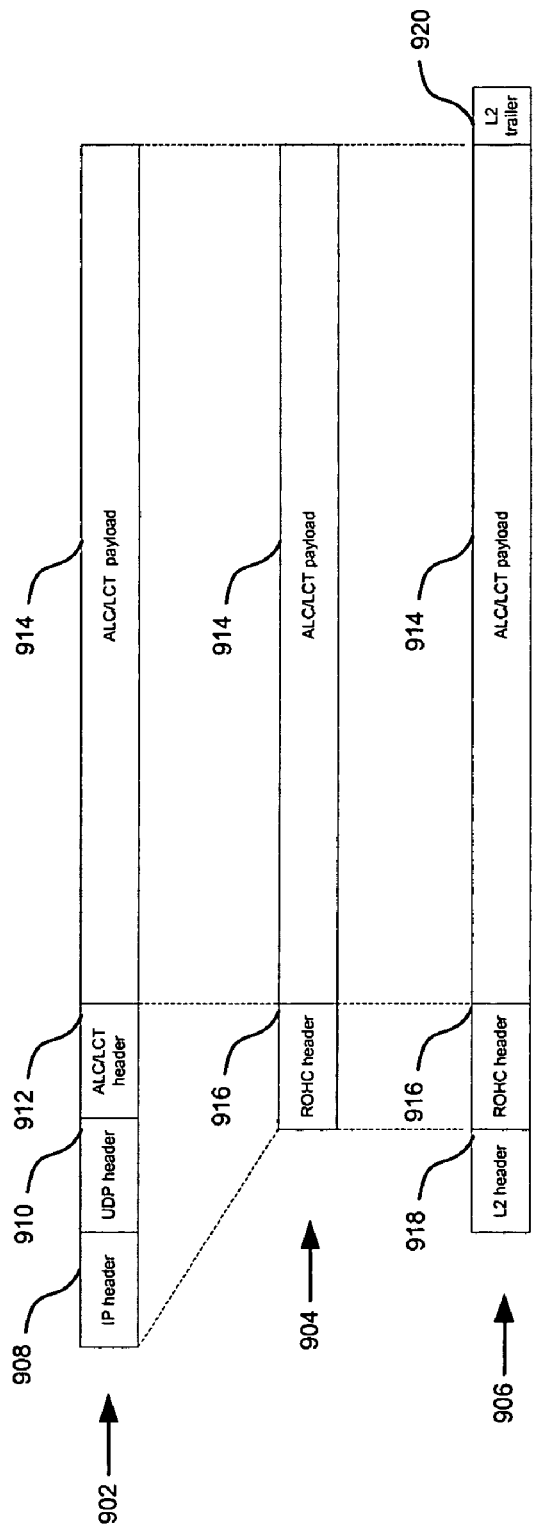
FIG. 9 is a diagram showing the compression of ALC/LCT packet header fields.

As described above, the present invention provides header compression for reliable multicast transport protocols, such as ALC, FLUTE, MUPPET, and NORM. As an example of such compression, FIG. 9 is a diagram showing header compression of an ALC/LCT packet according to the present invention. This compression begins with an uncompressed ALC/LCT packet 902, which includes an IP header 908, a UDP header 910, an ALC/LCT header 912, and an ALC/LCT payload 914. Through header compression techniques, a header-compressed packet 904 is generated from IP packet 902. As shown in FIG. 9, header-compressed packet 904 includes a compressed header 916 and ALC/LCT payload 914. Compressed header 916 is generated by compressing one or more fields in IP header 908 and UDP header 910, and ALC/LCT header 912 according to a compression context. This compression may be based on ROHC techniques and/or further multicast header compression techniques described herein.

In order to transmit header-compressed packet 904 across a network, a layer two packet 906 is generated from header-compressed packet 904. As shown in FIG. 9, layer two packet 906 includes ALC/LCT payload 914, a layer two header 918, and a layer two trailer 920.

Figure 10:
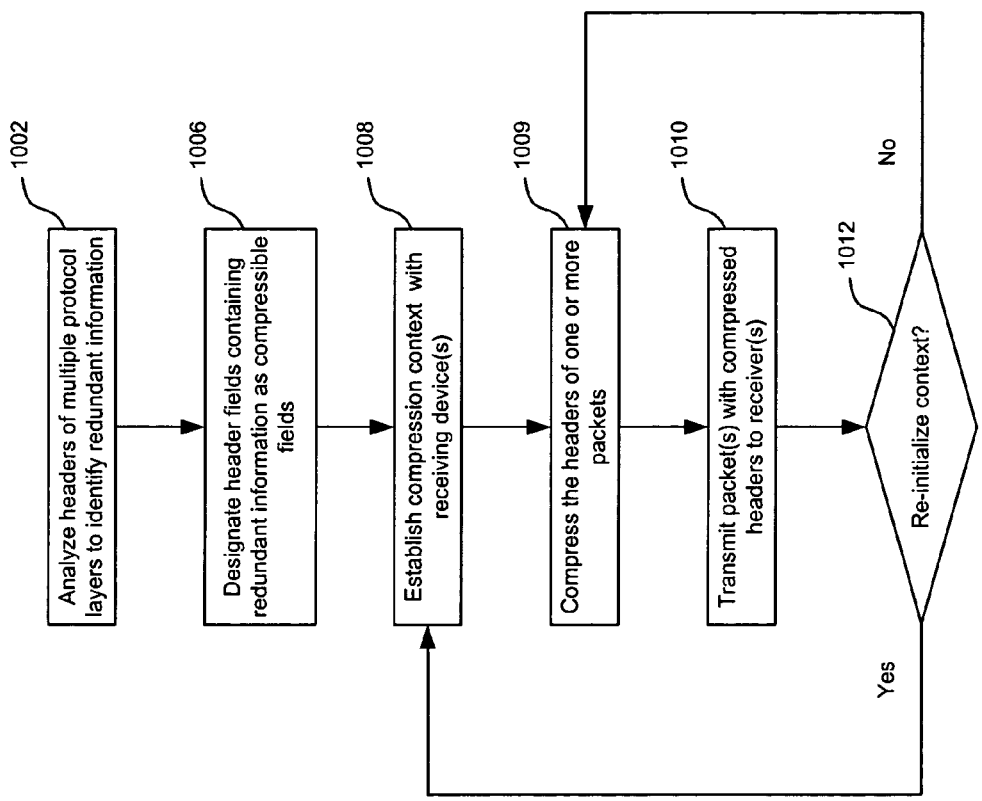
FIG. 10 is a flowchart of a transmitting device employing header compression in one embodiment of the present invention.

FIG. 10 is a flowchart of a packet transmission technique according to the present invention. This technique may be performed by various communications devices, such as host 102a and gateway 204a. Furthermore, this technique may be employed with various protocols. For instance, this technique may be employed with ALC/LCT/UDP/IP packets, FLUTE/ALC/LCT/UDP/IP packets, MUPPET/ALC/LCT/UDP/IP packets, and NORM/IUDP/IP packets.

The flowchart of FIG. 10 is described with reference to a transmitting device that transmits packets to one or more receiving devices. Accordingly, this technique may be employed in the operational environments of FIGS. 1 and 2. For example, in the environment of FIG. 1, host 102a operates as a transmitting device, while host 102b operates as a receiving device. However, in the environment of FIG. 2, gateway 204a operates as a transmitting device, while gateway 204b operates as a receiving device. In addition to the environments of FIGS. 1 and 2, the technique of FIG. 10 may be employed in further environments.

The flowchart of FIG. 10 includes a step 1002. In this step, before passing one or more packets to a Layer 2 protocol for transport, the transmitting device analyses headers of multiple protocol layers to discover any redundant information. This step may comprise identifying fields of one or more packet headers containing redundant information. These redundancies may be between multiple fields within a single packet header and/or between the same fields in different packet headers.

In a step 1006, the transmitting device designates the fields containing redundant information as compressible fields. This step may include assigning header fields to various categories. Such categories may indicate, for example, how often the corresponding fields change.

In a step 1008, the transmitting device establishes a context with one or more receiving devices. This may be established by transmitting one or more of the packets with uncompressed headers to the receiving device(s). Such transmissions may rely on an underlying layer 2 protocol. To establish a context, step 1008 may include the transmitting device storing current values for one or more packet header fields. In addition, this step may include the transmitting device identifying one or more patterns of change in header fields.

In a step 1009, the transmitting device compresses the headers of one or more packets. This results in compressed packets having headers with a reduced number of bits.

In a step 1010, the transmitting device transmits packets with compressed headers. These compressed headers have a reduced number of bits. This compression may be implemented in various ways. For instance, the transmitting device may only transmit changes in compressible field values between successive packets. Also, the transmitting device may reduce or eliminate redundant information between two or more fields in a single packet. These two or more fields may be within a single protocol header or within multiple protocol headers.

Through the compression and transmission of packets in steps 1009 and 1010, the transmitting device and the receiving device(s) maintain state information for each of the header fields. This state information is used by the receiving device(s) to recover the header information transmitted in compressed form. With reference to the environments of FIGS. 1 and 2, this information may be stored in compression context databases 112, 120, 222, and 230. This information may be stored as one or more variables. For example, in embodiments, each variable corresponds to a particular header field.

Periodically, the transmitting device (or the receiving device) may desire to re-initialize the context information. Accordingly, in a step 1012, the transmitting device determines whether to reinitialize the compression context. This determination may be based various factors, such as the number of packets transmitted or the time elapsed since establishing the context in step 1008. If the transmitting device desires to re-initialize the compression context, then operation returns to step 1008. With reference to the states of FIG. 5, this step may comprise a transition to IR state 502 from either FO state 504 or SO state 506. If the transmitting device does not desire to re-initialize the context, it continues to compress and transmit packets in steps 1009 and 1010.

The technique of FIG. 10 advantageously improves bandwidth efficiency and robustness of downlink packet flow, for example, in multicast applications such as file delivery (discrete media transfer). Moreover, this technique significantly improves the suitability of protocols, such as FLUTE (ALC file delivery) and MUPPET (IMG announcement) to wireless mobile applications.

V. Classification of Fields

As described above with reference to FIG. 10, a transmitting device may designate certain fields as compressible fields in step 1006. This step may comprise placing each header field into one or more compressible categories. Thus, the present invention provides a classification technique for header fields. According to this technique, each header field may be classified as a Class 1 field, a Class 2 field, or a Class 3 field. Class 1 fields are header fields that do not change at all for a sequence of packets (e.g., during an LCT session). Class 2 fields are header fields that change only occasionally for a sequence of packets. Class 3 fields are header fields that change from packet-to-packet for a sequence of packets. Thus, according to the present invention, Class 1 fields may be compressed most of the time, Class 2 fields may be compressed some of the time, and Class 3 fields must be sent as is.

An exemplary classification of the ALC and LCT fields of FIGS. 6 and 7 is provided below in Table 4. Also, an exemplary classification of FLUTE header fields of FIG. 8 is provided below in Table 5. However, other classifications are within the scope of the present invention.

TABLE 4

Exemplary ALC and LCT Header Field Classification

| Field Name | Classification |
|---|---|
| Version | Class 1 |
| C flag | Class 2 |
| Reserved | Class 1 |
| S flag | Class 1 |
| O flag | Class 1 |
| H flag | Class 1 |
| T flag | Class 1 |
| R flag | Class 1 |
| A flag | Class 2 |
| B flag | Class 2 |
| Header length | Class 1 |
| Codepoint | Class 2 |
| Congestion control information (CCI) | Class 2 |
| Transport Session Identifier (TSI) | Class 1 |
| Transport Object Identifier (TOI) | Class 2 |
| Sender Current Time | Class 3 |
| Expected Residual Time | Class 3 |
| Header Extensions | Class 1, Class 2, or Class 3 |
| FEC Payload ID | Class 3 |

TABLE 5

Exemplary FLUTE Header Field Classification

| Field Name | Classification |
|---|---|
| Type (in FEC Object Transmission Information Extension portion) | Class 1 |
| Header extension length (HEL) | Class 1 |
| FEC Instance ID | Class 2 |
| Transfer Length | Class 2 |
| FEC Encoding ID | Class 2 |
| Type (in FDT Instance Extension portion) | Class 1 |
| Version | Class 1 |
| FDT Instance ID | Class 3 |
| Type (in FDT Instance Compression Extension portion) | Class 1 |
| Comp (Compression algorithm used in FDT Instance payload) | Class 2 |
| Reserved | Class 1 |

VI. Compression States

The present invention provides for compression of multicast headers, such as ALC, LCT, FLUTE, and NORM headers, by employing ROHC techniques. Accordingly, in embodiments, a compressor may operate in various operational states. For instance, a compressor may operate according to the states of FIG. 5. With reference to the header field classifications described above, a transmitting device transmits packets with complete header information (both static and dynamic fields) in IR state 502 to store information on the reference values and pattern of change in header fields. This establishes a compression context with the transmitting device and one or more receiving devices. As described above with reference to FIG. 10, such a compression context is established in step 1008.

In ALC/LCT, header fields are more likely to be similar when the same value of Transport Object Identifier (TOI) is used compared to when the TOI value differs in ALC/LCT packets transmitted consecutively by the same transmitting device. For example, the FEC parameters are guaranteed to remain unchanged within each TOI of an ALC/LCT session, but may differ between different TOIs. Thus, in embodiments of the present invention, a distinct compression context for each TOI in the same ALC/LCT session are used to improve the efficiency of ALC/LCT header compression, compared to using just a single context for all the TOIs.

In further embodiments of the present invention, a distinct compression context for each Transport Session Identifier (TSI) in the same ALC/LCT session may be used to improve the efficiency of ALC/LCT header compression. This is because there also tends to be similarity between packet header of the same session.

After sending enough packets to allow the receiving device to learn the values of the static fields and the pattern of change in dynamic fields, the transmitter enters either FO state 504 or SO state 506.

In FO state 504, the transmitting device transmits one or more packets (referred to herein as FO packets) containing a sequence number and information on one or more (typically not all) changed header fields. As described above, most of this information is in the form of "deltas" between the value of the field in the current and the previous consecutive packet. These deltas are usually at least partially compressed. However, in FO state 504, some information (such as irregularities) are transmitted in uncompressed form. Decompressors are able to reproduce any fields not included in an FO packet (such as static fields) based on the compression context or the combination of the compression context and the sequence number. Using the three header field categories described above, various approaches may be employed in FO state 504. For instance, Class 1 header fields may be eliminated, Class 2 fields may be compressed as deltas, and Class 3 fields may be sent "as is." However, other approaches may be employed. In embodiments of the present invention, header fields may be compressed according to VLE and/or Huffman encoding techniques, as described above.

Figure 11:
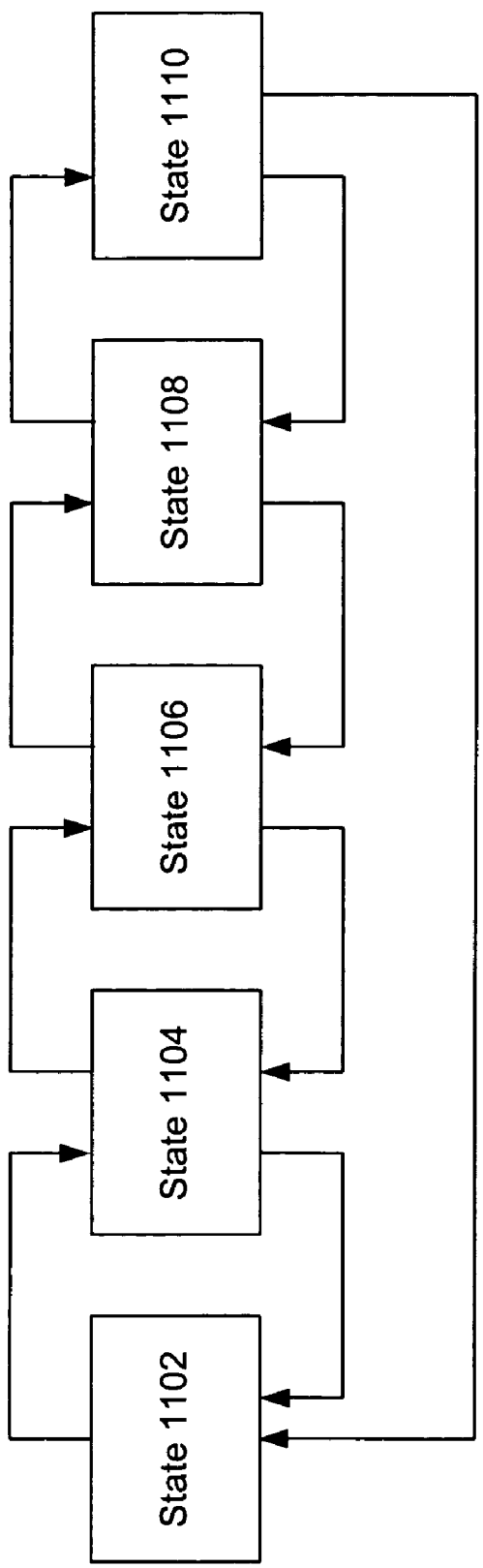
FIG. 11 is a diagram illustrating operational states machine for a compressor, according to the present invention.

Other states may be used as alternatives to the compressor states of FIG. 5. An example of such an alternative is shown in FIG. 11. FIG. 11 is a diagram operational states for a compressor according to embodiments of the present invention. As shown in FIG. 11, a compressor may operate in five states: a first state 1102, a second state 1104, a third state 1106, a fourth state 1108, and a fifth state 1110. FIG. 11 also shows various transitions between these states that may occur.

In first state 1102, all header fields are transmitted. However, transmission of certain trivial header fields may be skipped. Thus, during state 1102, the compressor signals a compression context to one or more decompressors through in-band transmissions. Accordingly, state 1102 corresponds to IR state 502.

In second state 1104, class 1 fields are eliminated from the headers. However, the remaining fields are compressed as far as possible.

In third state 1106, Class 1 fields are eliminated from headers. In addition, some or all of the class 2 fields may be eliminated from the headers. Any remaining fields are compressed and transmitted to update the context at the receiving decompressor(s). This ensures correct decompression.

In fourth state 1108, all Class 1 and Class 2 fields are eliminated from the headers, while any Class 3 fields are compressed as far as possible.

In fifth state 1110, all header fields are eliminated and reduced to just a compressed sequence number field. Currently there are no sequence numbers defined for LCT or ALC. However, in embodiments of the present invention, a sequence number field is added to the ALC and/or LCT headers. Such fields advantageously provide for more efficient header compression. ROHC already defines a method to include this kind of ROHC sequence number for its UDP profile in which no sequence number is initially included in the UDP and IP headers. Such a sequence number field (ROHC or otherwise) may be a compressed form of the CCI field from the LCT header.

As described above, ROHC provides for sequences of packets called compression windows. The lengths such windows may be periodically reduced to increase compression efficiency. This may be achieved by either discarding the oldest packets in the sequence or by entering IR state 502 to start a new sequence. According to one technique, older packets may be discarded from the compression window as the receiving device acknowledges the reception of those packets. This acknowledgement-based techniques may be employed for multicast protocols, such as NORM, because NORM is a feedback-oriented protocol in which receipt of transmissions are acknowledged. For protocols, such as ALC, FLUTE, and MUPPET, such acknowledgement-based techniques may be employed in network environments that provide for bidirectional transmission.

In unidirectional network environments (such as typical DVB networks), receiving devices are not able to acknowledge the receipt of compressed packets. Accordingly, in embodiments involving unidirectional transmissions (e.g., ALC packets), the compressor may automatically advance the trailing edge of the compression window with each packet once the window has grown to a pre-defined size. This size may be determined according to various techniques. For instance, window size may be determined according to packet loss estimates calculated by the compressor.

Moreover, in unidirectional environments, the compressor may maintain a timer or a packet counter that periodically causes it to revert to IR state 502 as in the unidirectional (U) mode of ROHC, or state 1102. This allows all receiving devices (including those lacking an uplink connection) to resynchronize to one or more reference headers transmitted in uncompressed form.

VII. Receiver Techniques

Figure 12:
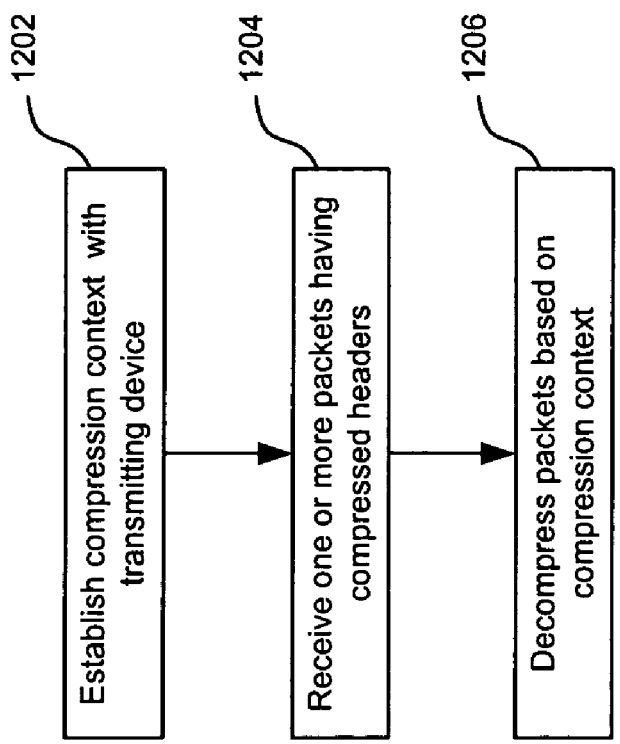
FIG. 12 is a flowchart of a receiving device employing header compression in one embodiment of the present invention.

FIG. 12 is a flowchart of a packet reception technique according to the present invention. This technique may be performed by various communications devices, such as host 102*b* and gateway 204*b*. Furthermore, this technique may be employed with various protocols. For instance, this technique may be employed with ALC/LCT/UDP/IP packets, FLUTE/ALC/LCT/UDP/IP packets, MUPPET/ALC/LCT/UDP/IP packets, and NORM/UDP/IP packets.

The flowchart of FIG. 12 is described with reference to a receiving device that receives packets from a transmitting device. This flowchart includes a step 1202 in which the receiving device establishes a compression context with a transmitting device. This step may include receiving one or more packets having uncompressed headers from the transmitting device. From these uncompressed headers, the receiving device may identify and store current values for one or more packet header fields. These current values may be used as reference values for decompressing packets. In addition, step 1202 may include the receiving device identifying and storing one or more patterns of change in packet header fields. In the environments of FIGS. 1 and 2, these values and patterns may be stored, for example, in context databases 120 and 230.

In a step 1204, the receiving device receives one or more packets having compressed headers. These headers may be compressed according to the ROHC techniques described above. Accordingly, the headers may include fields compressed as "deltas." Such fields may also be compressed according to VLE and Huffman encoding techniques.

In step 1206, the receiving device decompresses the header fields. This step may comprise determining values for compressed fields. Such determinations may be made according to various techniques. For instance, for static fields, this step may simply comprise replacing an omitted field value. For fields based on a predictable pattern of change, this step may comprise based on simply updating a previous value according to the predictable pattern (e.g., incrementing the previous value by a predetermined quantity).

If a receiving device fails to receive one or more packets belonging to a compression window, it will not be able to decompress the header fields of subsequently received packets belonging to the same compression window. To prevent a loss of synchronization, the receiving device may employ resynchronization techniques in step 1206. Such techniques may include the use of extrapolation functins to estimate the values of the missing header fields.

As described herein, compression contexts may be based on observed patterns in header fields. For instance, values of sequence number fields and time stamp fields may increase in a linear manner for successive packets. However, other patterns, such as non-linear patterns may be observed for values of fields.

Accordingly, to perform decompression in environments where packets are lost, a receiving device may establish one or more extrapolation functions. Each of these extrapolation functions corresponds to a particular field, by mathematically representing the pattern in which the field's values change. In the environments of FIGS. 1 and 2, these extrapolation functions may be stored, for example, in context databases 120 and 230.

When a receiving device fails to receive one or more packets, it may use such extrapolation functions to decompress a subsequently received packet based on, for example, the sequence number of the subsequently received packet. Examples of such VLE compression techniques are described in International Publication Number WO 01/28180 A2 (incorporated herein by reference in its entirety).

VIII. Compression Context Example

As described above with reference, for example, to steps 1008 and 1204, a compression context is established between a transmitting and a receiving device. Such a context may include header field values. The following is an example of a compression context involving FLUTE (indicated by field names on the left and their corresponding values on the right) according to the present invention.

| | |
|---|---|
| Version | 1 |
| A flag | 0 |
| B flag | 0 |

-continued

| | |
|---|---|
| Codepoint (FEC Encoding ID) | 0 |
| Congestion control information (CCI) | 0 (Not used) |
| Transport Session Identifier (TSI) | 0x11111111 |
| Transport Object Identifier (TOI) | 0x00000005 |
| Transfer Length | 0x0000000DBC00 |
| FEC Encoding ID specific format: | |
| Encoding Symbol Length | 0x03E8 |
| Maximum Source Block Length | 0x000061A8 |
| Version of FLUTE | 1 |
| FEC Payload ID related information | |

A context may also include information about the logical channels (e.g., ALC/LCT channel) associated with a file delivery session. Thus, a compression context may include the channels, as well as information about static (class 1) and infrequently changing (class 2) packet header fields.

If "Codepoint" (FEC Encoding ID in FLUTE) is used to refer to an Under-Specified FEC scheme, "FEC Instance ID" should also be included in the compression context. This inclusion defines that "Small Block, Large Block and Expandable FEC Codes(128)" are being used. The specific instance for this case is "Digital Fountain LT Code" (FEC Instance ID 0).

IX. Computer System

Figure 13:
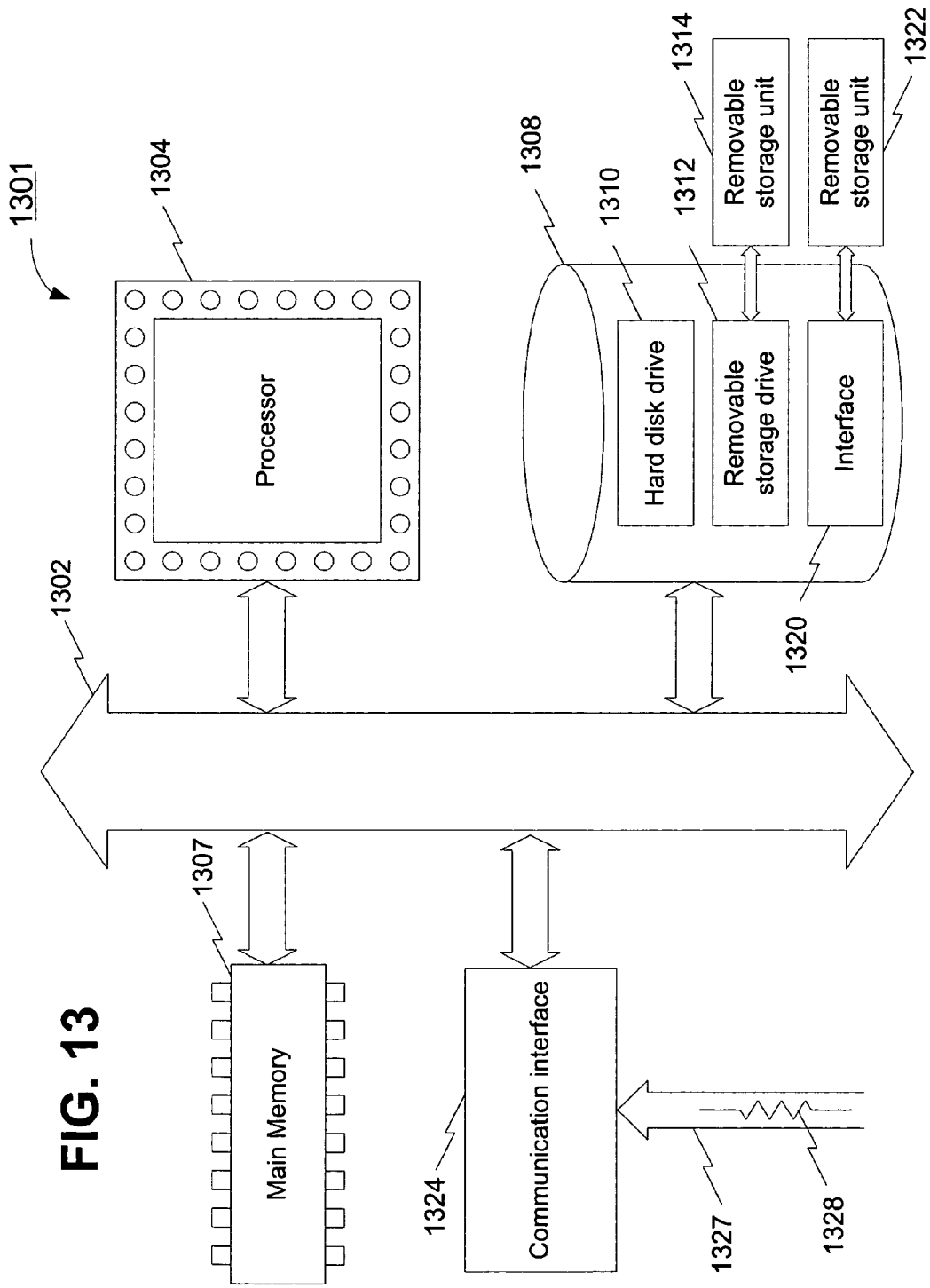
FIG. 13 is a diagram of an exemplary computer system.

As described above with reference to FIGS. 1 and 2, the techniques of the present invention may be employed in various environments by devices, such as hosts and gateways. These devices may be implemented in hardware, software, and/or firmware. Such implementations may include one or more computer systems. An example of a computer system 1301 is shown in FIG. 13. Computer system 1301 represents any single or multi-processor computer. Single-threaded and multi-threaded computers can be used. Unified or distributed memory systems can be used.

Computer system 1301 includes one or more processors, such as processor 1304. One or more processors 1304 can execute software implementing the techniques described above, for example, with reference to FIGS. 10 and 12. Each processor 1304 is connected to a communication infrastructure 1302 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1301 also includes a main memory 1307 which is preferably random access memory (RAM). Computer system 1301 may also include a secondary memory 1308. Secondary memory 1308 may include, for example, a hard disk drive 1310 and/or a removable storage drive 1312, representing a floppy disk drive, a magnetic tape drive, an optical disk drive, etc. Removable storage drive 1312 reads from and/or writes to a removable storage unit 1314 in a well known manner. Removable storage unit 1314 represents a floppy disk, magnetic tape, optical disk, read only memory (ROM), flash memory, etc., which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples can include a program cartridge and cartridge interface (such as that found in video game devices), a removable memory chip (such as an EPROM, PROM, or flash memory) and associated socket, and other removable storage units 1322 and interfaces 1320 which allow software and data to be transferred from the removable storage unit 1322 to computer system 1301.

Computer system 1301 may also include one or more communications interfaces 1324. Communications interface 1324 allows software and data to be transferred between computer system 1301 and external devices via communications path 1327. Examples of communications interface 1327 include a modem, a network interface (such as Ethernet card), a communications port, etc. Software and data transferred via communications interface 1327 are in the form of signals 1328 which can be electronic, electromagnetic, optical or other signals capable of being received by communications interface 1324, via communications path 1327. Note that communications interface 1324 provides a means by which computer system 1301 can interface to a network such as the Internet.

The present invention can be implemented 'using software running' (that is, executing) in an environment similar to that described above with respect to FIG. 13. In this document, the term "computer program product" is used to generally refer to removable storage units 1314 and 1322, a hard disk installed in hard disk drive 1310, or a signal carrying software over a communication path 1327 (wireless link or cable) to communication interface 1324. A computer useable medium can include magnetic media, optical media, or other recordable media, or media that transmits a carrier wave or other signal. These computer program products are means for providing software to computer system 1301.

Computer programs (also called computer control logic) are stored in main memory 1307 and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

The present invention can be implemented as control logic in software, firmware, hardware or any combination thereof. In an embodiment where the invention is implemented using software, the software may be stored in a computer program product and loaded into computer system 1301 using removable storage drive 1312, hard drive 1310, or interface 1320. Alternatively, the computer program product may be downloaded to computer system 1301 over communications path 1327. The control logic (software), when executed by the one or more processors 1304, causes the processor(s) 1304 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

X. Conclusion

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A packet transmission method, comprising:
   (a) establishing with a receiving device a compression context for a plurality of packets, the plurality of packets associated with at least a reliable multicast protocol, wherein each of the plurality of packets includes a header having a plurality of header fields;
   (b) generating a compressed packet for one of the plurality of packets, the compressed packet having a reduced number of bits in its header;
   said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and
   (c) transmitting the compressed packet to the receiving device.

2. The method of claim 1, wherein step (a) comprises transmitting one or more of the packets with uncompressed headers to the receiving device.

3. The method of claim 1, wherein step (a) further comprises storing a current value for one or more packet header fields.

4. The method of claim 1, wherein step (a) further comprises identifying one or more patterns of change in header fields.

5. The method of claim 1, wherein each of the plurality of packets are associated with the Layered Coding Transform (LCT) protocol.

6. The method of claim 5, wherein each of the plurality of packets are further associated with the Asynchronous Layered Coding (ALC) protocol.

7. The method of claim 6, wherein each of the plurality of packets are further associated with the FLUTE protocol.

8. The method of claim 6, wherein each of the plurality of packets are further associated with the MUPPET protocol.

9. The method of claim 5, wherein the plurality of packets each have the same Transport Object Identifier (TOI) flag.

10. The method of claim 5, wherein the plurality of packets each have the same Transport Session Identifier (TSI) flag.

11. The method of claim 1, wherein each of the plurality of packets are associated with the NACK-Oriented Reliable Multicast (NORM) protocol.

12. The method of claim 1, further comprising:
    (d) identifying one or more header fields as compressible.

13. The method of claim 12, wherein step (d) comprises placing each of the header fields into one of a plurality of categories, the plurality of categories including:
    a first category for header fields that do not change at all for the plurality of packets,
    a second category for header fields that change only occasionally for the plurality of packets, and
    a third category for header fields that changes for each of the plurality of packets.

14. The method of claim 13, wherein step (b) comprises:
    eliminating any header fields corresponding to the first category; and
    compressing any header fields corresponding to the second category.

15. The method of claim 1, wherein step (b) comprises replacing a field in the header of the one packet with a compressed header field having a reduced number of bits.

16. The method of claim 15, wherein the compressed field represents a change in value from a corresponding header field in a previous packet.

17. The method of claim 15, wherein step (b) further comprises performing variable length encoding on the compressed header field.

18. The method of claim 15, wherein step (b) further comprises performing Huffman encoding on the compressed header field.

19. The method of claim 1, wherein step (c) comprises encapsulating the compressed packet in a transmission frame of a layer two protocol.

20. A packet reception method, comprising:
    (a) establishing with a transmitting device a compression context for a plurality of packets, the plurality of packets associated with at least a reliable multicast protocol, wherein each of the plurality of packets includes a header having a plurality of header fields;
    (b) receiving a compressed packet from the transmitting device, the compressed packet having a reduced number of bits in its header;
    said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and
    (c) decompressing the compressed packet based on the compression context.

21. The method of claim 20, wherein step (a) comprises receiving one or more of the packets with uncompressed headers from the transmitting device.

22. The method of claim 20, wherein step (a) further comprises storing a current value for one or more packet header fields.

23. The method of claim 20, wherein step (a) further comprises identifying one or more patterns of change in header fields.

24. The method of claim 20, wherein each of the plurality of packets are associated with the Layered Coding Transform (LCT) protocol.

25. The method of claim 24, wherein each of the plurality of packets are further associated with the Asynchronous Layered Coding (ALC) protocol.

26. The method of claim 25, wherein each of the plurality of packets are further associated with the FLUTE protocol.

27. The method of claim 25, wherein each of the plurality of packets are further associated with the MUPPET protocol.

28. The method of claim 24, wherein the plurality of packets each have the same Transport Object Identifier (TOI) flag.

29. The method of claim 24, wherein the plurality of packets each have the same Transport Session Identifier (TSI) flag.

30. The method of claim 20, wherein each of the plurality of packets are associated with the NACK-Oriented Reliable Multicast (NORM) protocol.

31. The method of claim 20, wherein step (c) comprises performing variable length decoding on the compressed packet.

32. The method of claim 20, wherein step (c) comprises performing Huffman decoding on the compressed packet.

33. A system, comprising:
a context database for storing a compression context for a plurality of packets, the plurality of packets associated with at least a reliable multicast protocol, wherein each of the plurality of packets includes a header having a plurality of header fields;
a compressor for generating a compressed packet for one of the plurality of packets, the compressed packet having a reduced number of bits in its header;
said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and
a sender for transmitting the compressed packet to a receiving device.

34. The system of claim 33, wherein each of the plurality of packets are associated with the Layered Coding Transform (LCT) protocol.

35. The system of claim 34, wherein each of the plurality of packets are further associated with the Asynchronous Layered Coding (ALC) protocol.

36. The system of claim 35, wherein each of the plurality of packets are further associated with the FLUTE protocol.

37. The system of claim 35, wherein each of the plurality of packets are further associated with the MUPPET protocol.

38. The system of claim 33, wherein each of the plurality of packets are associated with the NACK-Oriented Reliable Multicast (NORM) protocol.

39. A system, comprising:
a context database for storing a compression context for a plurality of packets, the plurality of packets associated with at least a reliable multicast protocol, wherein each of the plurality of packets includes a header having a plurality of header fields;
a receiver for receiving a compressed packet from a transmitting device, the compressed packet corresponding to one of the plurality of packets and having a reduced number of bits in its header;
said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and
a decompressor for generating an uncompressed packet from the compressed packet based on the compression context.

40. The system of claim 39, wherein each of the plurality of packets are associated with the Layered Coding Transform (LCT) protocol.

41. The system of claim 40, wherein each of the plurality of packets are further associated with the Asynchronous Layered Coding (ALC) protocol.

42. The system of claim 41, wherein each of the plurality of packets are further associated with the FLUTE protocol.

43. The system of claim 41, wherein each of the plurality of packets are further associated with the MUPPET protocol.

44. The system of claim 39, wherein each of the plurality of packets are associated with the NACK-Oriented Reliable Multicast (NORM) protocol.

45. A computer program product comprising a computer useable storage medium having computer program logic recorded thereon for enabling a processor in a computer system of a device to transmit packets, the computer program logic comprising:
program code for enabling the processor to establish with a receiving device a compression context for a plurality of packets, the plurality of packets associated with at least a reliable multicast protocol, wherein each of the plurality of packets includes a header having a plurality of header fields;
program code for enabling the processor to generate a compressed packet for one of the plurality of packets, the compressed packet having a reduced number of bits in its header;
said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and
program code for enabling the processor to transmit the compressed packet to the receiving device.

46. A computer program product comprising a computer useable storage medium having computer program logic recorded thereon for enabling a processor in a computer system of a device to receive packets, the computer program logic comprising:
program code for enabling the processor to establish with a transmitting device a compression context for a plurality of packets, the plurality of packets associated with at least a reliable multicast protocol, wherein each of the plurality of packets includes a header having a plurality of header fields;
program code for enabling the processor to receive a compressed packet from the transmitting device, the compressed packet having a reduced number of bits in its header;
said compressed packet formed by compression in one of a plurality of states ranging from an initialization and refresh state for sending packets having substantially complete header information, to more compressed states for sending one or more packets with headers having progressively more compressed header information, said compression adaptively reverting from said more compressed states to said initialization and refresh state to accommodate unidirectional receivers of the multicast packets, wherein the reverting in compression states is triggered at an expiration of a timer or a sequence counter of the multicast packets; and program code for enabling the processor to decompress the compressed packet based on the compression context.

* * * * *